United States Patent
Cook et al.

(10) Patent No.: US 6,504,909 B1
(45) Date of Patent: Jan. 7, 2003

(54) REVERSE REGISTRATION METHOD IN A SYSTEM FOR THE AUTOMATIC NOTIFICATION THAT A CALL TO AN EMERGENCY SERVICE HAS OCCURRED

(76) Inventors: William C. Cook, 5506 Colbath Ave., Van Nuys, CA (US) 91401; Don E. Reich, 2420 Stafford Rd., Thousand Oaks, CA (US) 91361; Kurt E. Warner, 230 Rincon Point Rd., Carpenteria, CA (US) 93103; Angelo Salvucci, 1679 Franceschi Rd., Santa Barbara, CA (US) 93103

( * ) Notice: Subject to any disclaimer, the term of this patent is extended or adjusted under 35 U.S.C. 154(b) by 158 days.

(21) Appl. No.: 09/712,655

(22) Filed: Nov. 13, 2000

(51) Int. Cl.[7] .............................................. H04M 11/00
(52) U.S. Cl. ................................... 379/45; 379/127.05
(58) Field of Search ............................. 379/45, 37, 38, 379/39, 40, 41, 42, 46, 51, 127.05, 201.01, 201.03

(56) References Cited

U.S. PATENT DOCUMENTS

| | | | | |
|---|---|---|---|---|
| 5,195,126 A | * | 3/1993 | Carrier et al. | 379/45 |
| 5,805,670 A | * | 9/1998 | Pons et al. | 379/45 |
| 6,201,856 B1 | * | 3/2001 | Orwick et al. | 379/45 |
| 6,295,346 B1 | * | 9/2001 | Markowitz et al. | 379/45 |

\* cited by examiner

*Primary Examiner*—Stella Woo
(74) *Attorney, Agent, or Firm*—Owen L. Lamb

(57) ABSTRACT

A registration method in a system for calling designated addressable notify devices in response to a 9-1-1 call. When a registration call is received from a new customer, the software proceeds with a voice answerback menu to register numbers to be notified. Two choices are provided. The customer can choose a standard notify service or a reverse notify service. In standard notify service parties designated by the customer are notified of 9-1-1 calls originating at the customers telephone. In reverse notify service if a party designated by the customer calls 9-1-1, the customer is notified of 9-1-1 calls originating at the designated party's telephone. The notify numbers are stored in a list in a database memory maintained by the notify service. If a call is received from a current subscriber, the software proceeds with a voice answerback menu to update the previously registered numbers to be notified. Subsequently, if a 9-1-1 call is placed from a station that has previously been registered with the service, the software automatically places a call to each addressable notify device on the subscriber's notify list. If an answer is confirmed, the software transmits a notify message over the telephone or wireless line.

6 Claims, 9 Drawing Sheets

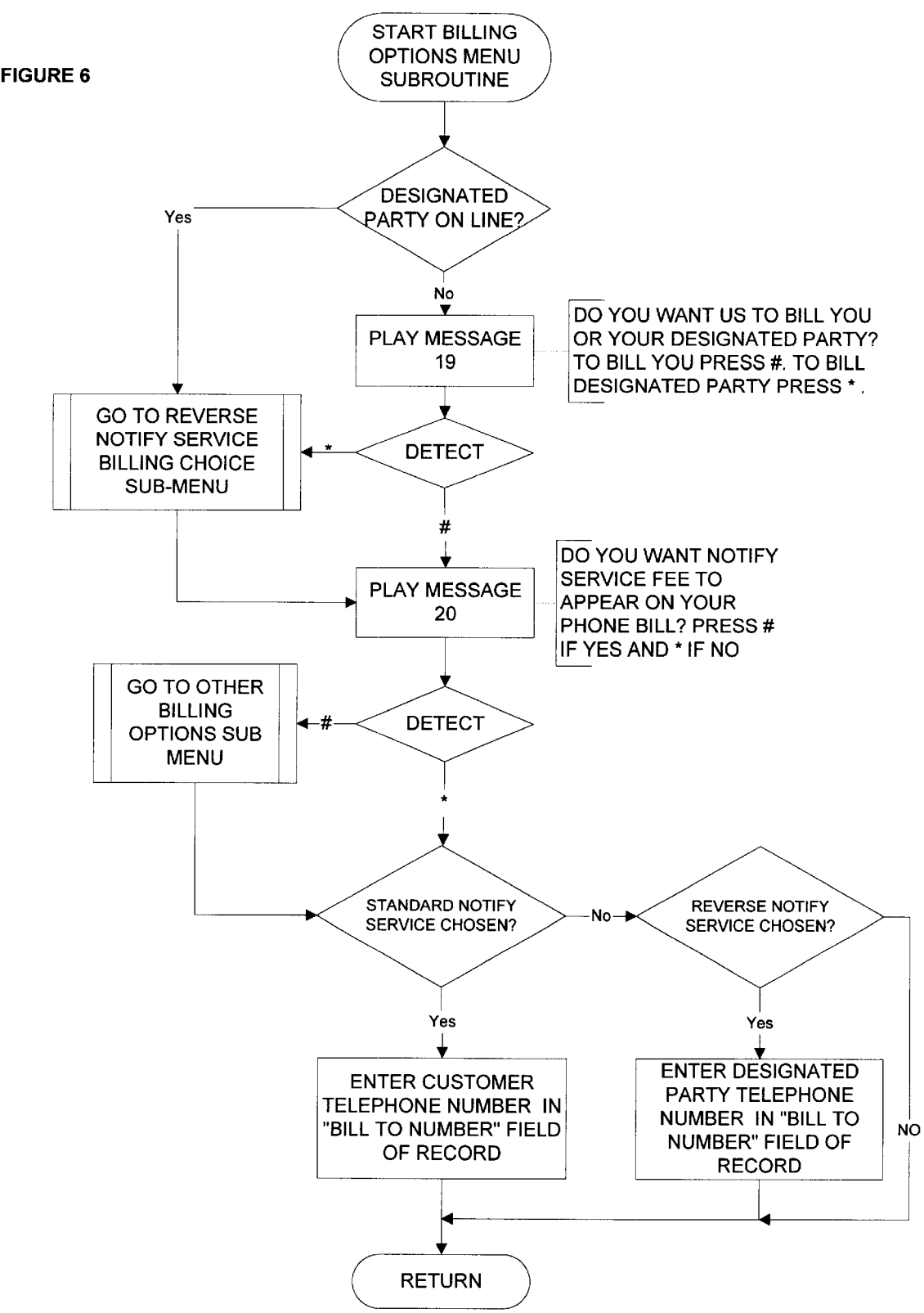

FIGURE 7

| SUBSCRIBER NUMBER | ACCOUNT STATUS | REVERSE NOTIFY STATUS | BILL TO NUMBER | NOTIFY NUMBER | INTERNET ADDRESS | INFORMATION LINE NUMBER | LANGUAGE | CALL LATER TAG | SECURITY CODE |
|---|---|---|---|---|---|---|---|---|---|
| (XXX) XXX-XXXX | X | XX | (XXX) XXX-XXXX | (XXX) XXX-XXXX | XXXXXXXXXXX | XXXXXXXXXXX | XXX | | XXX |
| (XXX) XXX-XXXX | X | XX | (XXX) XXX-XXXX | (XXX) XXX-XXXX | XXXXXXXXXXX | XXXXXXXXXXX | XXX | X | XXX |
| (XXX) XXX-XXXX | X | XX | (XXX) XXX-XXXX | (XXX) XXX-XXXX | XXXXXXXXXXX | XXXXXXXXXXX | XXX | X | XXX |
| (XXX) XXX-XXXX | X | XX | (XXX) XXX-XXXX | (XXX) XXX-XXXX | XXXXXXXXXXX | XXXXXXXXXXX | XXX | X | XXX |

POINTER

REVERSE REGISTRATION METHOD IN A SYSTEM FOR THE AUTOMATIC NOTIFICATION THAT A CALL TO AN EMERGENCY SERVICE HAS OCCURRED

CROSS-REFERENCE TO RELATED APPLICATIONS

This application is related to application Ser. No. 09/467,641 filed Dec. 20, 1999, of Don E. Reich, et al. titled "System For The Automatic Notification That A 9-1-1 Call Has Occurred" which is incorporated herein by reference.

BACKGROUND OF THE INVENTION

1. Field of the Invention

This invention relates to telecommunication networks and more particularly, to a registration method for use in an automated notification system which responds whenever a call to an emergency service has occurred by placing an outbound notification call to a list of predetermined telephone numbers.

2. Description of the Prior Art

Nationwide in the United States, a non-toll telephone number 9-1-1 has been designated for calls relating to emergencies that threaten human life or property. The above-referenced application Ser. No. 09/467,641 describes a computer driven telecommunications system that automatically reacts to all emergency 9-1-1 calls that result in a automatic number identification (ANI) query to the local telephone company's Automatic Location Identification (ALI) system. All ANI's are examined to determine if the ANI is for a customer that has subscribed to the system and, if so the system responds through existing telephone networks by notifying addressable communication devices that a 9-1-1 call has been placed from the subscriber's telephone.

Registration for the service may be through the local telephone company, or directly to the new system, or a combination of both. During the registration mode, a telephone customer registers their telephone number and telephone number(s) to be notified upon the occurrence of 9-1-1 call originating at the subscriber's telephone. The fee for the service appears on the subscribers telephone bill or by direct mailing. Registration via the local telephone company requires transfer of data for each registrant to the system's master subscriber database.

Those telephone customers that have subscribed to the service will have information transmitted to designated notify telephone numbers. Notification is comprised of placing an outgoing connection to each subscriber's list of addressable communication devices to be notified under the terms of the system and placing a voice or text messages on the connection, informing the communication device that the subscriber has initiated a 9-1-1 call.

It is desirable to provide a system wherein a telephone customer can subscribe to a service in which the subscriber can register one or more phone numbers to be automatically notified in the event a call to an emergency service is initiated from a designated party's telephone number (other than the subscribers telephone).

SUMMARY OF THE INVENTION

Description of the Invention

Briefly, the invention relates to a method of registering subscribers to a telephone service in a telecommunications network including an emergency call center. The registration method comprises presenting service choices to a subscriber, one of the service choices being a reverse notify service related to calls by a designated party to the emergency call center. The method requests a subscriber telephone number, notify number or numbers (one of which may be the same as the subscriber telephone number) and a designated party telephone number from the subscriber in response to the subscriber having chosen the reverse notify service.

The method obtains consent of the designated party to the reverse notify service, and registers the notify number(s) associatively with the designated party telephone number in an emergency call notification service memory.

In accordance with an aspect of the invention, the method determines that a telephone call within the network to a specified telephone number originated at a calling station, a telephone number of the calling station being the designated telephone number registered in the emergency call notification service memory. The notify number is used to automatically place a telephone call to a notify station, a telephone number of the notify station being the notify telephone number registered associatively with the designated party telephone in the emergency call notification service memory.

In accordance with another aspect of the invention, the method may post a reverse notify service fee to an account associated with the subscriber telephone number. The registration may present billing options to the subscriber, a first billing option being bill to the subscriber telephone number and a second billing option being bill to the designated party telephone number. In this event, the consent of the designated party is obtained upon a condition that the second billing option is chosen by the subscriber and a reverse notify service fee is posted to an account associated with the subscriber telephone number or to an account associated with the designated party telephone number depending upon the billing option chosen by the subscriber.

BRIEF DESCRIPTION OF THE DRAWINGS

The invention will be described in greater detail with reference to the drawings in which:

FIGS. 2 through 6 illustrate in flow chart form the principles of the computer programs that implement the present invention; and, FIG. 7 illustrates an example of a subscriber record, which is stored as an entry in a database.

DETAILED DESCRIPTION OF THE INVENTION

Overview of the Invention

Figure 1:
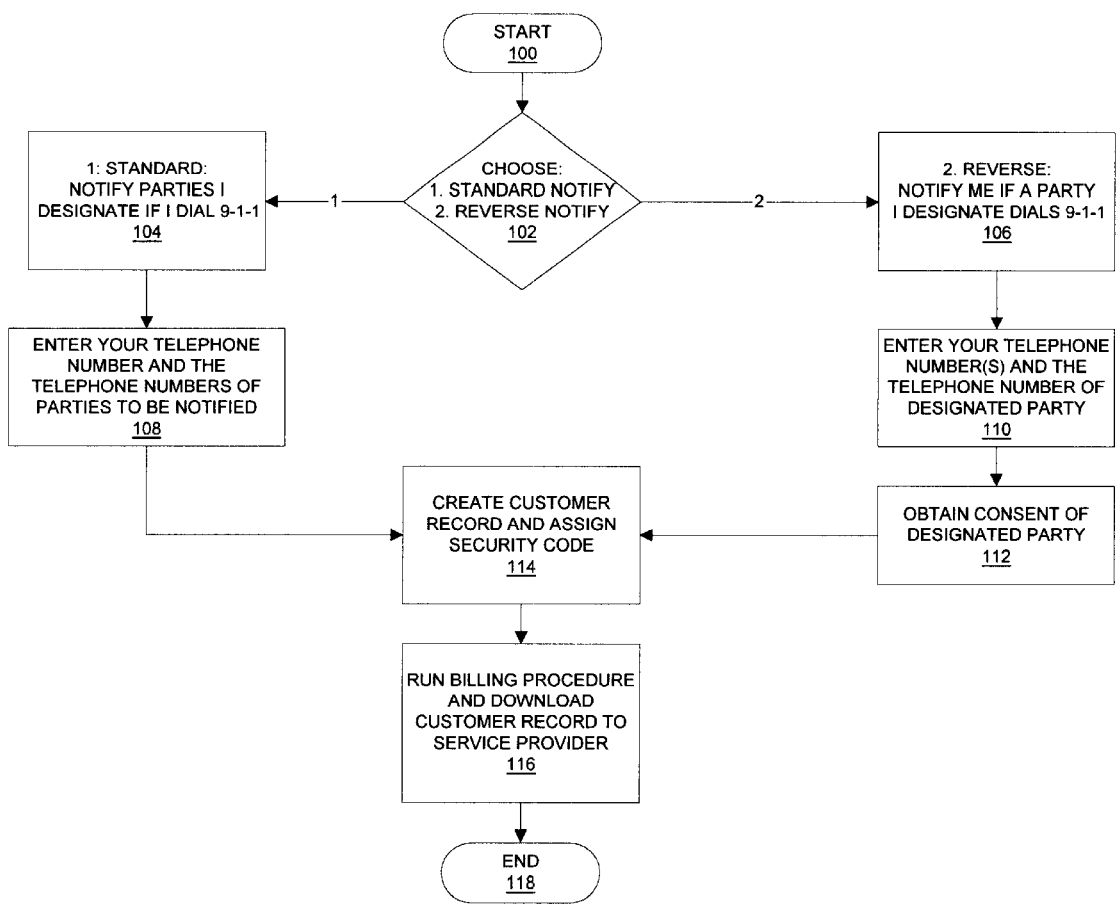
FIG. 1 is a flow diagram of a notify service selection process.

The invention pertains to an automatic system for notifying designated communication devices that a 9-1-1 call has been placed. Advertisement of the 9-1-1-call notification service directs the future subscriber to call their local telephone provider to sign up for the service. During sign-up, the local telephone company may either obtain the addressable communication devices to be notified and supply the new subscriber a password for accessing the system's Interactive Voice Response (IVR) for future editing of the addresses or provide the new subscriber with only a password to access the systems IVR directly, thus allowing the new subscriber to input the notify addresses directly. In either event, the telephone company provides a download of the subscriber's ANI and the associated notify numbers and/or the provided password to the new system's main subscriber database by means of transferred data.

Access to the system's IVR is established via a voice telephony connection (toll free 800 or other) and/or an Internet address Web page. When a voice telephony call is received from a subscriber and the password is confirmed, the software proceeds with a voice answer-back menu allowing the subscriber to register new notify device addresses, edit/change existing notify device addresses, test the system without calling 9-1-1, etc. Subscribers sign up over the Internet by accessing the system's Internet Web page directly. Similar options offered through the IVR system are offered via the Internet- addressed on-line menu.

Subsequently, if a 9-1-1 call is placed from a station that has previously been registered with the standard notify service, the software automatically notifies each device on the subscriber's notify list. Alternatively, if a 9-1-1 call is placed from a designated station that has previously been registered with the reverse notify service, the software automatically notifies the device(s) as determined by the subscriber to the reverse notify service. If a telephone or other two-way communication device answer is confirmed, the software transmits the notify information to the device. The information at least identifies the calling phone number, and the time and date of the call. If an answer is not confirmed, or the line is busy, the software turns on a "call later" tag associated with the notify number corresponding to the unconfirmed or uncompleted call. Periodically, the software services any tagged unconfirmed notify calls. For Internet or other one-way text or other devices, the notify information is sent.

The following details the preferred method for the implementation of the invention. It shall be understood by those familiar with the telecommunications field that actual implementation shall be predicated on the state of the relevant telephony/communication technology at the time of implementation of the current invention and the level of involvement of the network telephony/communication service provider in the implementation of the current invention.

DETAILED DESCRIPTION OF THE INVENTION

FIG. 1 shows in flow chart form a method of registering subscribers to a telephone notify service in a telecommunications network including an emergency call center. The registration method presents service choices 102 to a customer by a voice menu over the telephone, as an Internet web page, or other facility. One of the service choices is a standard notify service 104 related to calls by a subscriber party to the emergency call center. The other service choice is a reverse notify service 106 related to calls by a designated party to the emergency call center.

If the standard notify service is selected, the method requests that the customer enter a subscriber telephone number, and the notify numbers of parties to be notified 108. In the standard notify service parties are notified if a call is placed from the subscribers telephone and the subscriber's telephone is billed. The process creates a customer record, registers the notify number associatively with the designated party telephone number in an emergency call notification service memory and assigns a security code 114. Finally, a billing procedure is run and the customer record is downloaded to a service provider's computer 116 and the process ends 118.

If the reverse notify service is selected, the method requests that the customer enter a notify number or numbers and a designated party's telephone number 110. In this case, the consent of the designated party must be obtained 112. In the reverse notify service a subscriber is notified if a call is placed from a designated party's telephone. After the process obtains consent of the designated party to the reverse notify service 112 the process creates a customer record, registers the notify number(s) associatively with the designated party telephone number in an emergency call notification service memory and assigns a security code 114. Finally, a billing procedure is run and the customer record is downloaded to a service provider's computer 116 and the process ends 118.

Once registered as a subscriber to the notify service, the method determines that a telephone call within the network to a specified telephone number originated at a calling station, a telephone number of the calling station being the designated telephone number registered in the emergency call notification service memory. The notify number is used to automatically place a telephone call to a notify station, a telephone number of the notify station being the notify telephone number registered associatively with the designated party telephone in the emergency call notification service memory.

The registration may present billing options to the subscriber, a first billing option being bill to the subscriber telephone number and a second billing option being bill to the designated party telephone number. In the latter event, the consent of the designated party is obtained and a reverse notify service fee is posted to an account associated with the subscriber telephone number or to an account associated with the designated party telephone number depending upon the billing option chosen by the subscriber. Additional billing options, such as credit card billing and direct mailing are also available to both the subscriber and designated party.

The local telephone provider shall supply the service provider with customer data, which will include the ANI of the new subscriber, the password assigned to the new subscriber, and status and accounting protocols as required. The data shall be disseminated and organized by the service provider into a System Subscriber Database.

Initial Registration Menu

Figure 2:
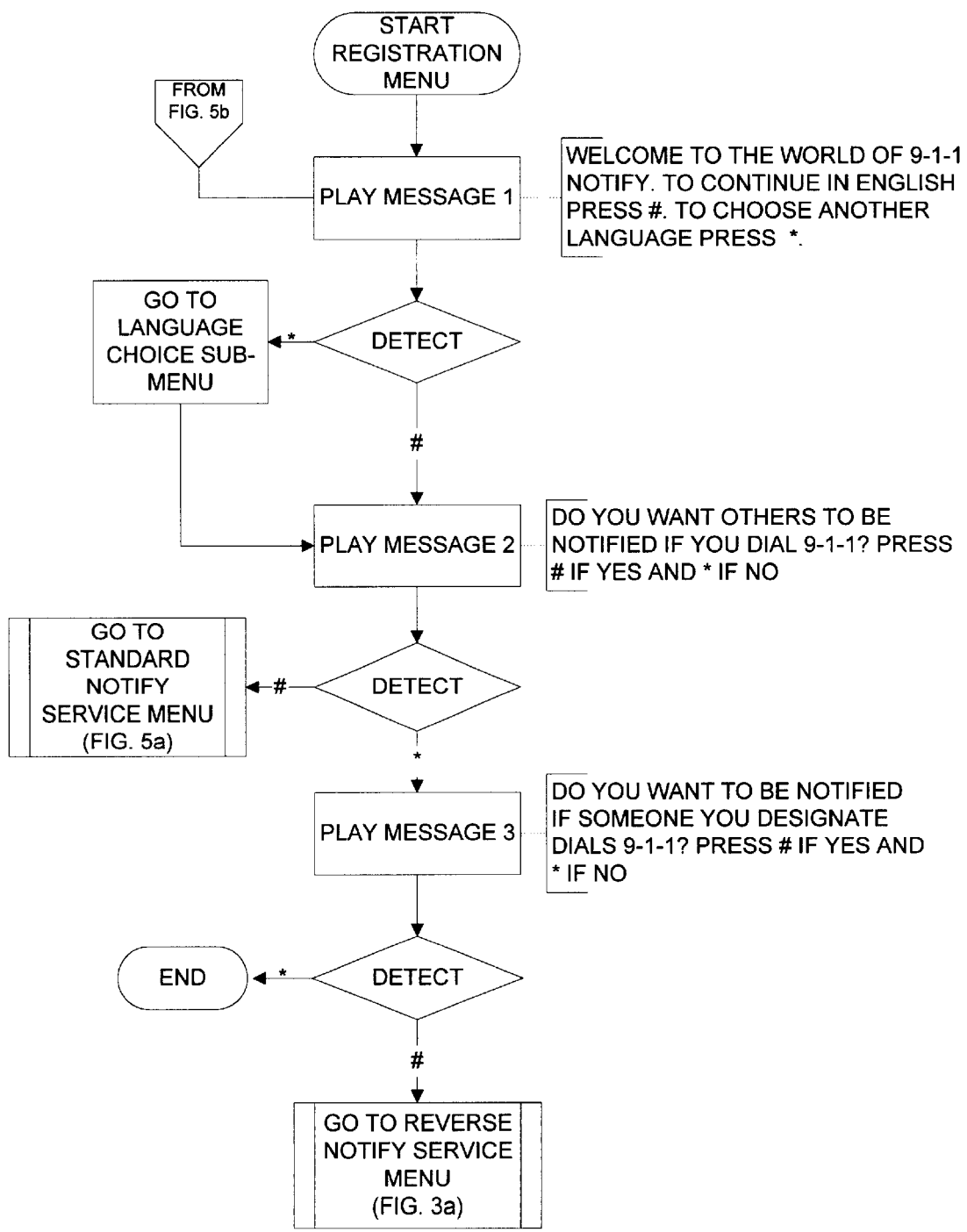
Figure 3A:
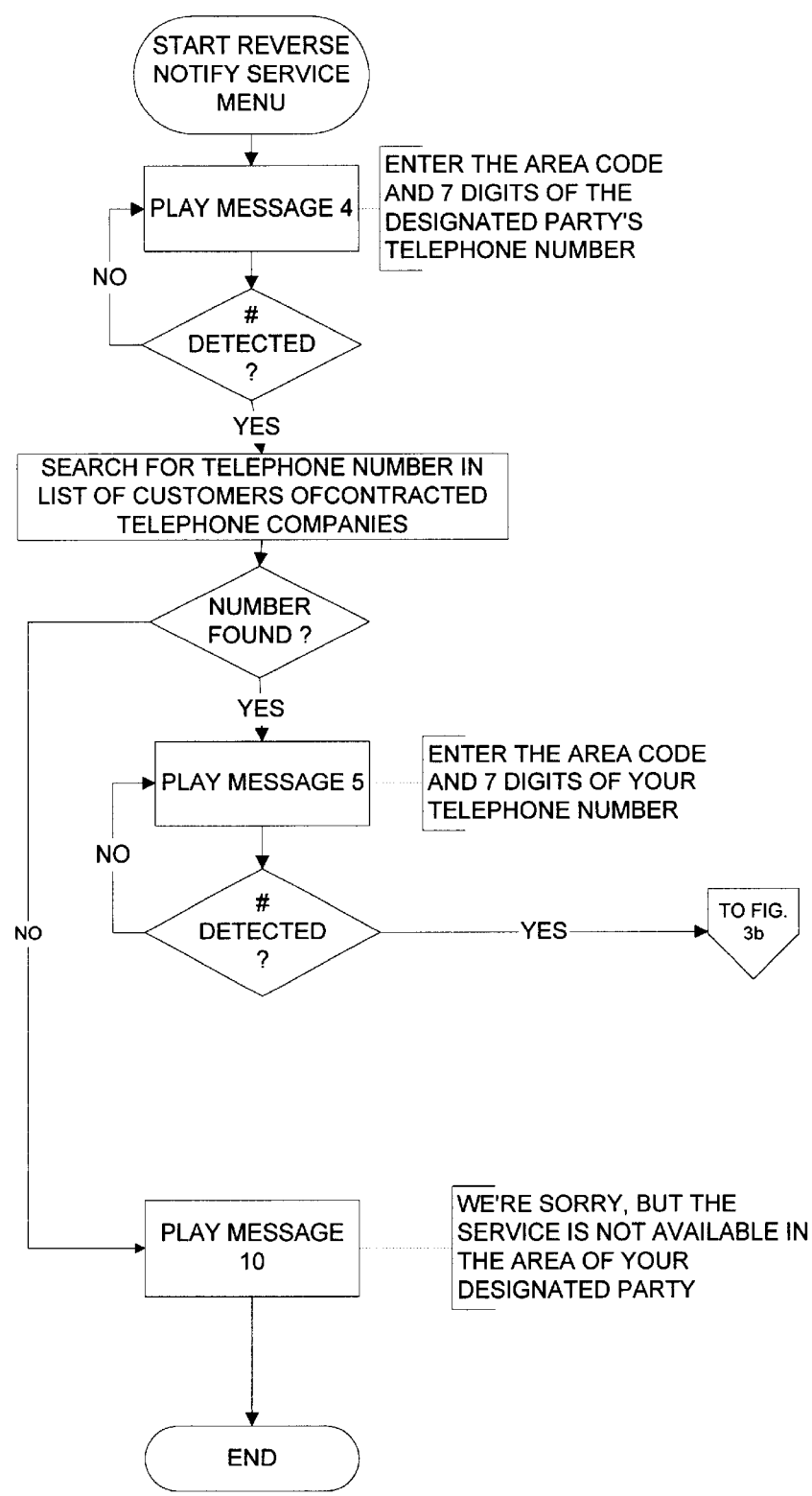
Figure 3B:
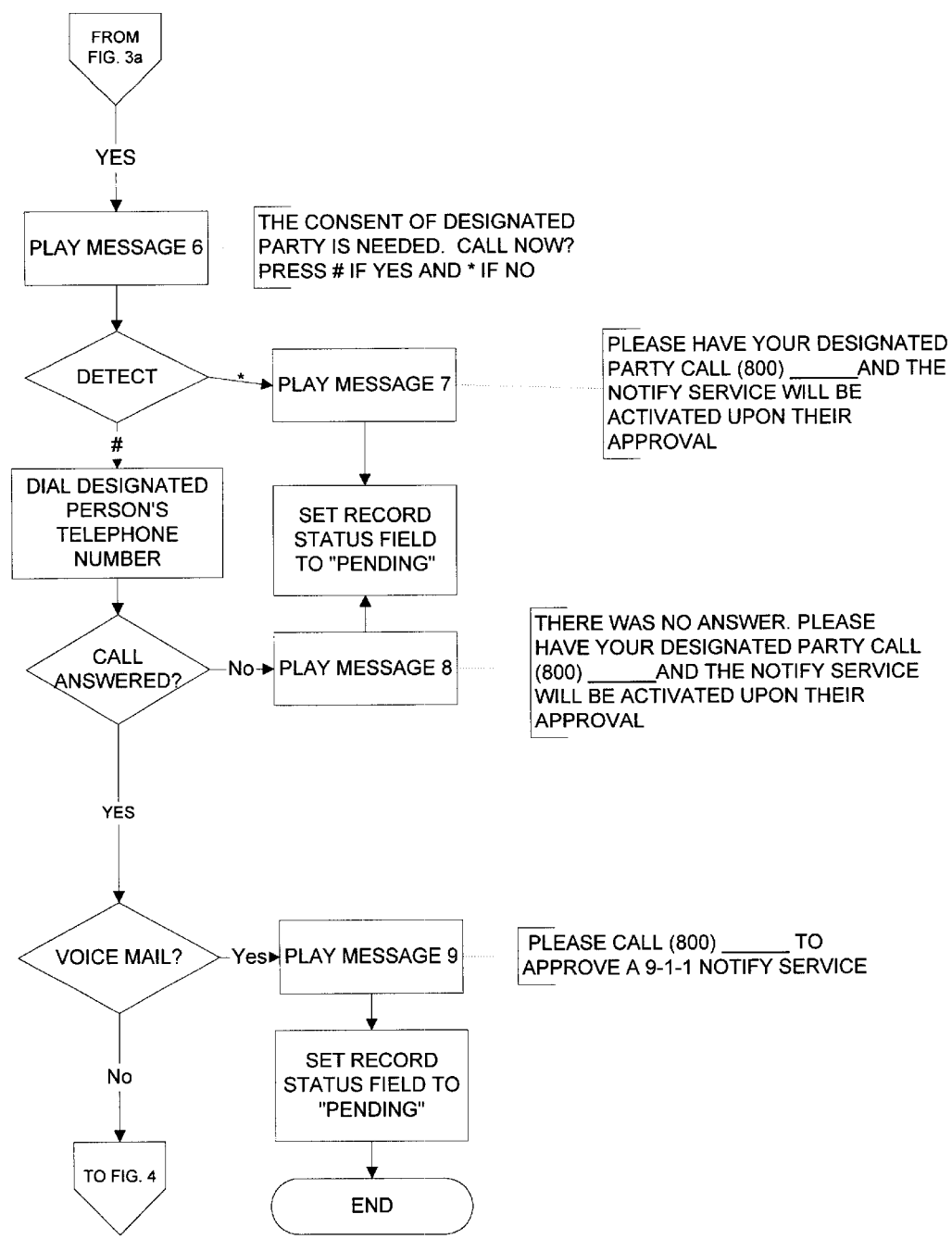
Figure 4:
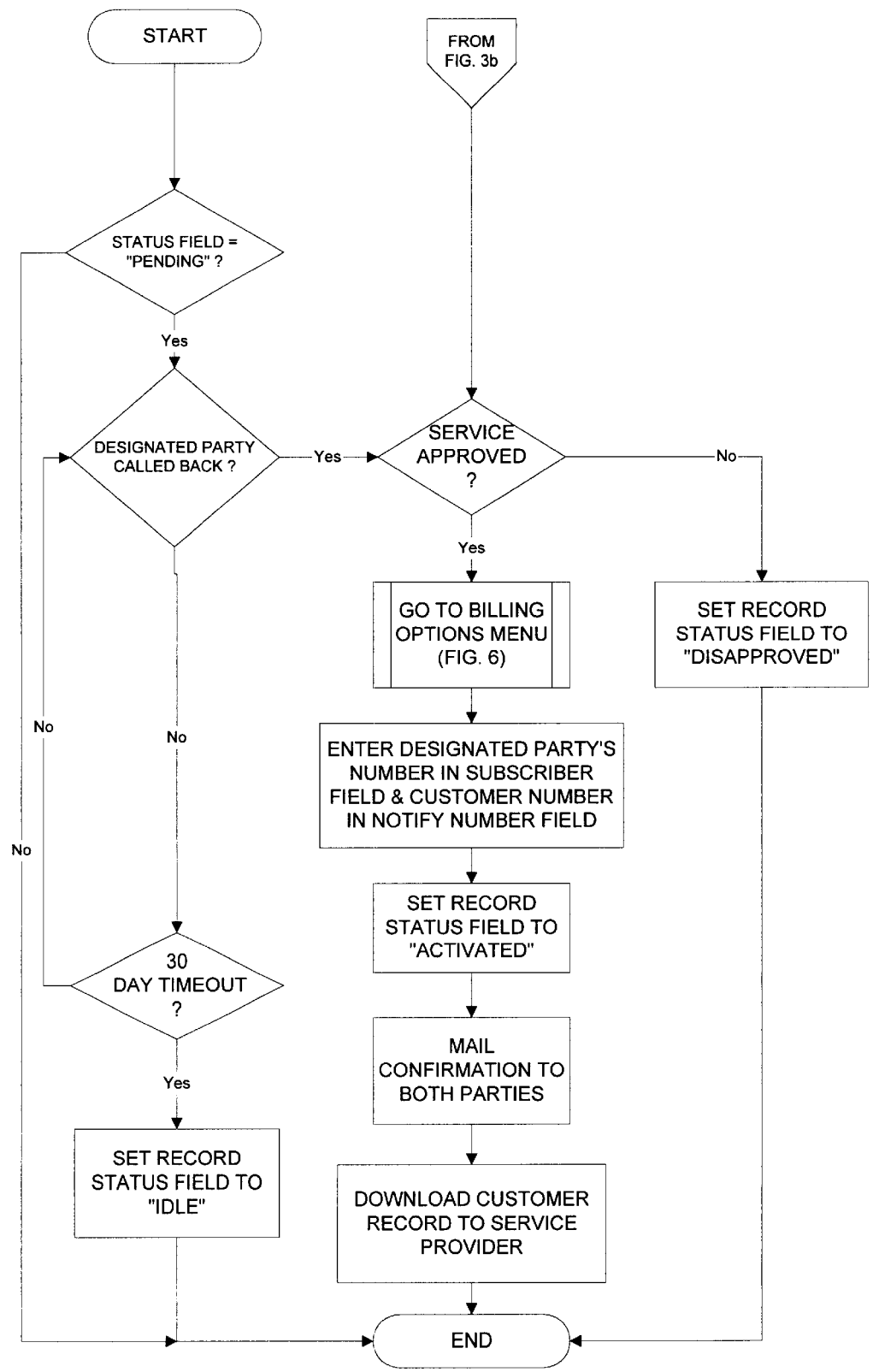
Figure 5A:
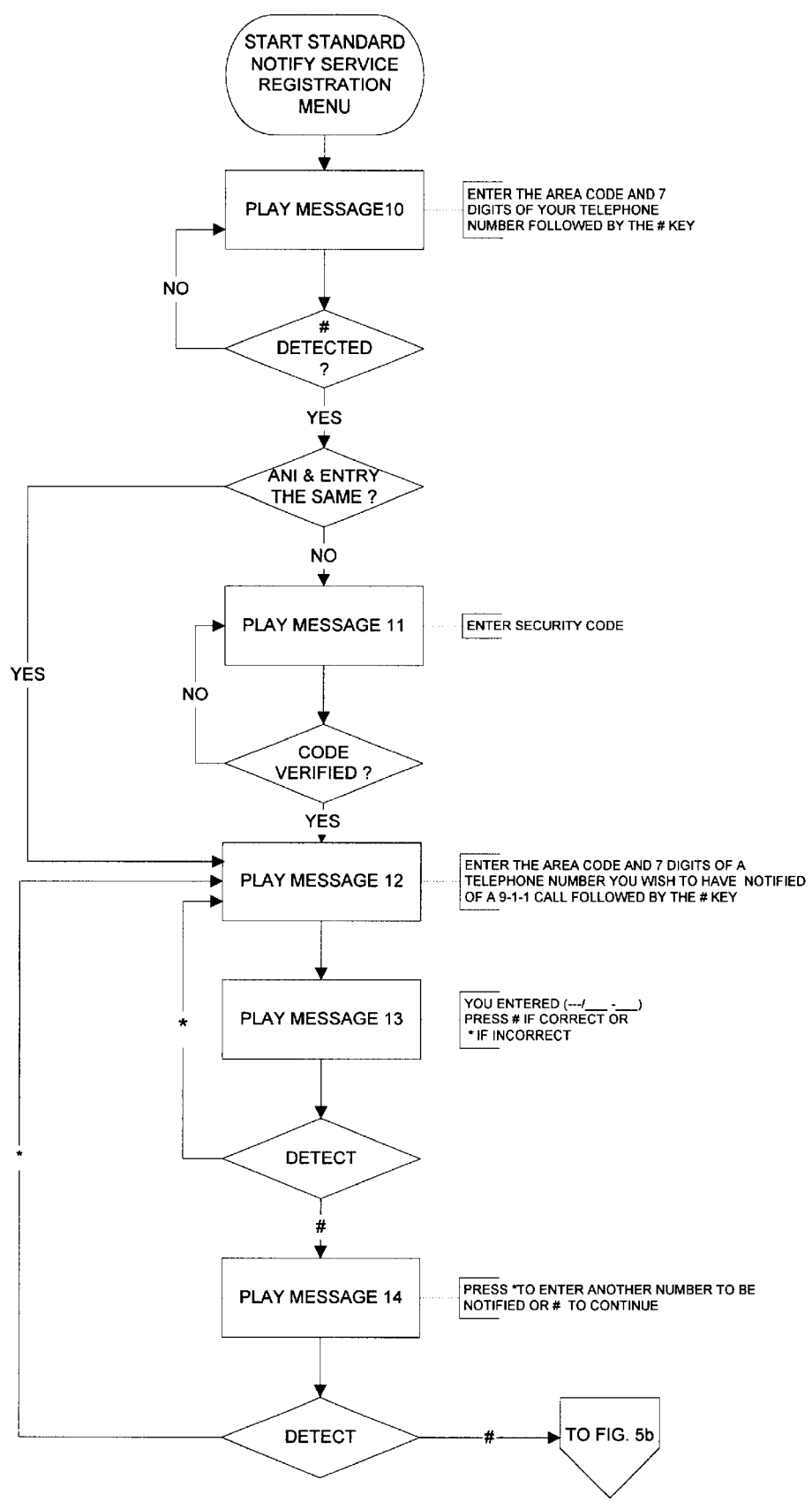
Figure 5B:
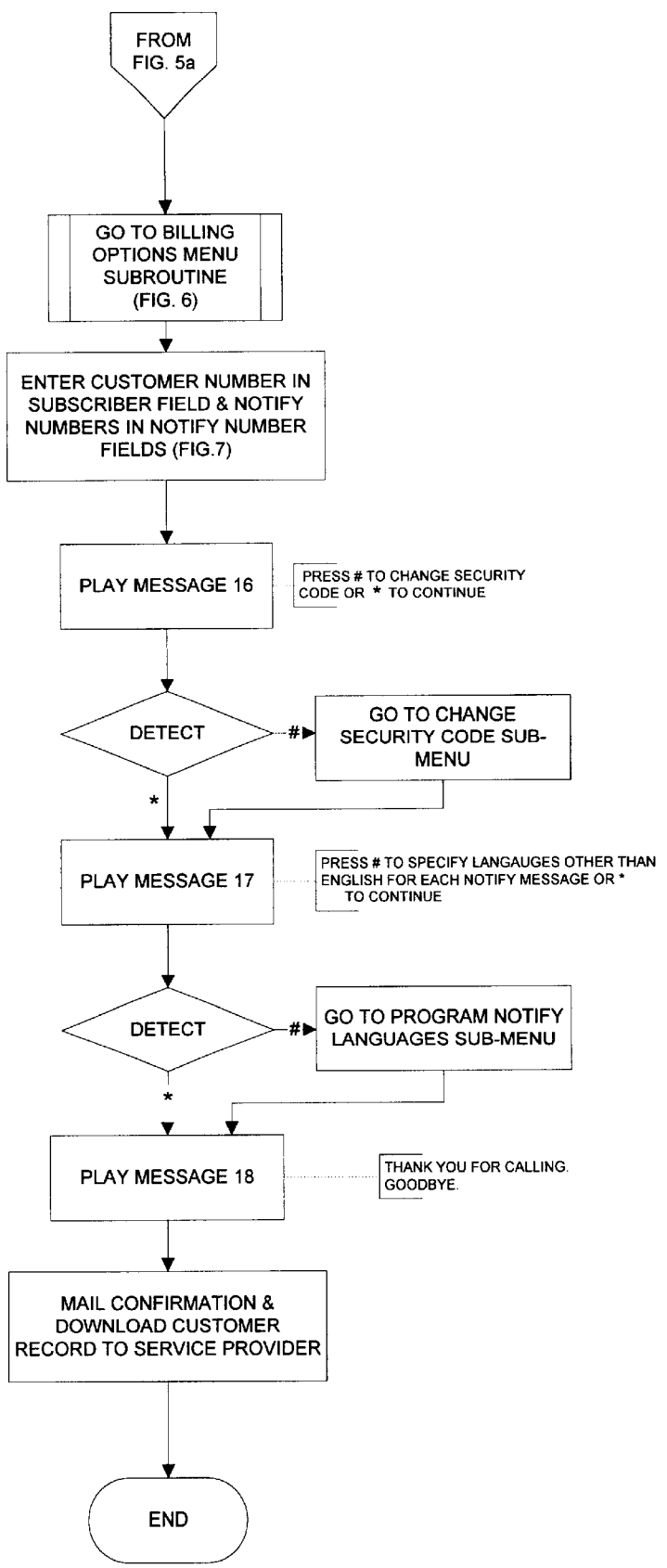

Refer to FIG. 2, which illustrates the basic principles of the notify service registration in flow chart form. If the software detects that a user wants others to be notified if the user dials 9-1-1 the flow proceeds to the standard notify service menu (FIGS. 5a–b). If the software detects that a user wants to be notified if some designated party dials 9-1-1 the flow proceeds to the reverse notify service menu (FIGS. 3a, 3b and 4). Otherwise the flow ends.

Reverse Notify Registration Menu

Refer to FIGS. 3–4, which illustrate the basic principles of the reverse notify service registration portion of the system in flow chart form. Once the service is approved (FIG. 4) the flow proceeds to the billing options menu (FIG. 6).

Billing Options Menu

Refer to FIG. 6, which illustrates the basic principles of the billing options portion of the system in flow chart form. The billing options menu is called from the flow diagram of FIG. 4 (reverse notify service registration) or the flow diagram of FIG. 5b (standard notify service registration). If the customer chooses to have the notify fee appear on the phone bill, the customer telephone number is entered in the "bill to number" field of the subscriber record (FIG. 7) in the case of standard notify service registration. In the case of reverse notify service registration the designated party telephone number is entered in the "bill to number" field of the subscriber record (FIG. 7). If the customer chooses not to have the notify fee appear on the phone bill, the flow proceeds to the "Other billing options sub menu". This submenu is not shown in flow chart form, but it will be understood by those skilled in the art that other billing methods, such as credit card billing, instant check, invoicing, Internet encryption, electronic signatures, etc. can all be easily accommodated.

Standard Notify Registration Menu

Refer to FIGS. 5a and 5b, which illustrate the basic principles of the standard notify service registration portion of the system in flow chart form. A new subscriber contacts their local telephone provider and registers for the new notification system. The new subscriber is provided with a password by the local telephone provider and instructed to contact the service provider's registration line to access the system and register the new subscriber's notify number(s).

When a call is received to the new system's registration line, the software decodes the automatic number identification (ANI). Next, the software searches the database for an entry for this ANI. If an entry is found, then the caller is calling from a number that is previously registered with their local telephone provider. The system continues with verification of the subscriber's password. If an entry is not found the system informs the user to enter a registered phone number and password or contact their local telephone provider to register with the service.

For confirmed subscribers, the software continues with the voice response registration menu subroutine. After return from the voice response registration menu subroutine, the software stores the notify numbers and specified languages in the System Subscriber Database for this ANI (subscriber). Thereafter, the registration mode ends.

Subscriber Record

The subscriber record (FIG. 7) may include the subscriber's telephone number, an account status, a reverse notify service status field, a list of subscriber-supplied notify number(s), a bill to number, the subscriber's name and location, subscriber-supplied Internet addresses, an information line, a language choice, a call later tag and a security code. The reverse notify service status field is coded as follows:

00 IDLE
01 SERVICE DISAPPROVED
10 SERVICE ACTIVATED
11 SERVICE APPROVAL PENDING

A software pointer selects a record based on a match between a search argument (such as subscriber number, call later tag, etc.) and an entry in one of the corresponding fields of the record. The reverse notify service status field is periodically tested by the software (FIG. 4) to complete the reverse notify service approval. Once the reverse notify service is approved, the status field is set to "Activated" and the flow proceeds to the billing options menu (FIG. 6). If the reverse notify service is not approved the status field is set to "Disapproved" and the flow ends.

The invention has been described with reference to the use of telephone devices and the identification of a caller and a notified called station as using telephone devices. It will be understood by those skilled in the art that other devices may be employed to practice the invention.

The invention has been described with reference to Interactive Voice Response (IVR) systems in the registration and notification modes. It will be understood by those skilled in the art that the exact content of the messages may vary from that as stated herein.

The invention has been described with reference to the current non-toll telephone number 9-1-1 designated for calls relating to emergencies that threaten human life or property. It shall be understood by those skilled in the art that the invention can be used with other telephone numbers designated for precise purposes. Examples are the proposed 3-1-1 number for non emergencies in the United States and the 0-6-6 number proposed for emergencies in the country of Mexico.

The term and concept "telephone number" is not intended to be limited to an actual telephone set in the conventional sense. It will be understood that the telephone number or Automatic Number Identification (ANI) in use today may be replaced by any manifestation that identifies the origination point of a call. With the current blurring of the distinction between televisions, Internet-connected computers, cell phones, pagers, facsimile, etc., there will probably be a more universal ID such as a "Personal Information Address" in use. This Personal Information Address could represent one's phone number, Internet address, etc or other information-transfer device. For purposes of the present invention, the information-transfer device from which the subscription is entered, and the information-transfer device to which the notification that a 9-1-1 call has queried an ALI database system response can be any addressable communication device that can be identified by a unique address.

The registration process is shown as occurring from a telephone, whereas it could come from another medium such as over the Internet or filling out a mail in registration card wherein a clerk enters the information.

As Internet communication and telephony become more popular, the present invention can be practiced there as well. The subscription process can occur over the Internet, the recognition that an Internet telephone 9-1-1 call has occurred can be ascertained, and the delivery of the notification message to an Internet phone or other addressable information device can take place.

While the invention has been particularly shown and described with reference to preferred embodiments thereof, it will be understood by those skilled in the art that the foregoing and other changes in form and detail may be made therein without departing from the scope of the invention.

What is claimed is:

1. In a telecommunications network including an emergency call center a method comprising:

A. presenting service choices to a subscriber, one of said service choices being a reverse notify service related to calls by a designated party to said emergency call center;

B. requesting a subscriber telephone number, a notify number and a designated party telephone number from said subscriber in response to said subscriber having chosen said reverse notify service;

C. registering said notify number associatively with said designated party telephone number in an emergency call notification service memory; and, D. posting a reverse notify service fee to an account associated with said subscriber telephone number.

2. The method of claim 1 further comprising:

E. obtaining consent of said designated party to said reverse notify service.

3. The method of claim 1 further comprising:

E. determining that a telephone call within said network to a specified telephone originated at a calling station, a telephone number of said calling station being said designated telephone number registered in said emergency call notification service memory; and, F. utilizing said notify number to automatically place a telephone call to a notify station, a telephone number of said notify station being said notify telephone number registered associatively with said designated party telephone in said emergency call notification service memory.

4. The method of claim 1 wherein said step D further comprises a step of:

posting a reverse notify service fee to an account associated with said subscriber telephone number or to an account associated with said designated party telephone number depending upon a billing option chosen by said subscriber.

5. In a telecommunications network including an emergency call center a method comprising:

A. presenting service choices to a subscriber, one of said service choices being a reverse notify service related to calls by a designated party to said emergency call center;

B. requesting a subscriber telephone number, a notify number and a designated party telephone number from said subscriber in response to said subscriber having chosen said reverse notify service;

C. registering said notify number associatively with said designated party telephone number in an emergency call notification service memory;

D. presenting billing options to said subscriber, a first billing option being bill to said subscriber telephone number and a second billing option being bill to said designated party telephone number;

E. obtaining consent of said designated party upon a condition that said second billing option is chosen by said subscriber; and, F. posting a reverse notify service fee to an account associated with said subscriber telephone number or to an account associated with said designated party telephone number depending upon the billing option chosen by said subscriber.

6. The method of claim 5 further comprising:

G. determining that a telephone call within said network to a specified telephone originated at a calling station, a telephone number of said calling station being said designated telephone number registered in said emergency call notification service memory; and, H. utilizing said notify number to automatically place a telephone call to a notify station, a telephone number of said notify station being said notify telephone number registered associatively with said designated party telephone in said emergency call notification service memory.

* * * * *